United States Patent
Umezawa et al.

[11] Patent Number: 6,122,806
[45] Date of Patent: Sep. 26, 2000

[54] TENSIONING CLIP FOR SEAT COVERING

[75] Inventors: Fumio Umezawa; Eiji Toba, both of Tochigi-ken, Japan

[73] Assignee: TS TECH Co., Ltd., Japan

[21] Appl. No.: 09/190,822

[22] Filed: Nov. 12, 1998

[30] Foreign Application Priority Data

| May 14, 1998 | [JP] | Japan | 10-150682 |
| Jul. 22, 1998 | [JP] | Japan | 10-222351 |

[51] Int. Cl.[7] ............... F16B 45/00; B42F 1/00; A47C 7/00
[52] U.S. Cl. ............ 24/598.6; 24/67.9; 24/552; 24/546
[58] Field of Search ............... 24/598.6, 598.1, 24/601.1, 546, 552, 555, 67.9; 297/218.1

[56] References Cited

U.S. PATENT DOCUMENTS

| 282,183 | 7/1883 | Fletcher | 24/552 |
| 415,030 | 11/1889 | Dillard | 24/598.6 |
| 2,840,898 | 7/1958 | Yeo | 24/598.6 |
| 3,333,307 | 8/1967 | Wheeler | 24/598.6 |
| 3,630,572 | 12/1971 | Homler | 297/218.1 |
| 3,633,253 | 1/1972 | Ellis | 24/67.9 |
| 3,724,178 | 4/1973 | Le Boeuf | 24/552 |
| 4,057,292 | 11/1977 | Arnold | 24/546 |

FOREIGN PATENT DOCUMENTS

| 0730338 | 8/1932 | France | 24/598.6 |

*Primary Examiner*—Victor N. Sakran
*Attorney, Agent, or Firm*—Dann, Dorfman, Herrell and Skillman, P.C.

[57] ABSTRACT

A seat covering tensioning clip for use to bridge a trimming wire provided on a seat covering and a spring supporting a seat pad or an insert wire embedded in the seat pad to thereby tension the seat covering, comprises an annular base, and a pair of J-shaped arms extending from the annular base in a nearly same direction, and each having a straight portion and an inwardly bent portion, the bent portions facing each other; the clip being adapted to receive each of the first and second object wires from between the bent portions thereof, thereafter the first object wire being securely retained in the annular base while the second object wire is securely caught between the bent portions superposed on each other.

5 Claims, 12 Drawing Sheets

TENSIONING CLIP FOR SEAT COVERING

BACKGROUND OF THE INVENTION

1. Field of the Invention

The present invention relates to a clip for use to tension a seat covering.

2. Description of the Prior Art

Generally in a conventional automotive seat, a covering of the seat is trimmed and kept tensioned with a C-ring which is used to bridge a trimming wire placed in a suspension bag sewn to a covering of a central portion of the seat along the width thereof or to ends, sewn on each other, of the central-portion covering, and a covering of a side portion, of the seat, and an insert wire embedded in a seat pad of the seat. Alternatively, the seat covering is tensioned with a coil spring used to bridge, at hook portions thereof, the trimming wire and a zigzag spring which supports the seat pad.

However, the C-ring and coil spring are fatigued as they are repeatedly used, and deteriorated as the time passes. The C-ring will be deformed with the axis thereof straightened, and the coil spring will also be deformed with the hook portions thereof straightened. As the result, the C-ring or coil spring will come off the trimming wire and insert wire, or off the zigzag spring. The coil spring will be elongated so that the seat covering will possibly be loosened or relaxed.

In some of automotive seats incorporating an air bag, a covering of a side portion, and a lateral covering, of the seat are so sewn on each other at ends thereof that a seam thus formed will fissure under an expansion pressure of the air bag when inflated. For a quick fission of the seam of the coverings under the expansion pressure of the inflated air bag, it is required to securely retain the other ends of the side-portion covering against the expansion pressure of the inflated air bag.

Of the coverings forming, as sewn at the ends thereof on each other, the seam to fissure when the air bag is inflated, the lateral covering of the seat can be fixed at the other end thereof securely to a seat back frame. However, in case the C-ring or coil spring is used to retain the sewn ends of the central- and side-portion coverings, it will be elongated under the expansion pressure of the inflated air bag, which will not possibly allow the seam of the covering ends to fissure.

SUMMARY OF THE PRESENT INVENTION

Accordingly, the present invention has an object to overcome the drawbacks of the prior art by providing a seat covering tensioning clip destined for use to securely bridge a trimming wire provided on a seat covering, and a spring supporting a seat pad or an insert wire embedded in the seat pad, and which will not be opened, deformed or elongated even when the seat covering is heavily tensioned.

Also the present invention has another object to provide a seat covering tensioning clip suitable for use in a seat incorporating an air bag and having a seam formed by sewing, on each other, ends of a side-portion covering, and a lateral covering, of the seat and which is to fissure when the air bag is inflated, to securely retain the other end of the side-portion covering.

The above object can be accomplished by providing a seat covering tensioning clip for use to bridge a trimming wire, as a first object wire, provided on a seat covering and a spring supporting a seat pad or an insert wire embedded in the seat pad, as a second object wire, to thereby tension the seat covering, comprising an annular base; and a pair of J-shaped arms extending from the annular base in a nearly same direction, and each having a straight portion and an inwardly bent portion, the bent portions facing each other; the clip being adapted to receive each of the first and second object wires from between the bent portions of the J-shaped arms, the first object wire being securely caught in the annular base while the second object wire is securely caught between the bent portions superposed on each other.

According to the present invention, the pair of J-shaped arms has the straight portions thereof extended from the annular base obliquely away from each other, and the second object wire put inside the clip is securely caught between the bent portions which are superposed on each other.

Also, according to the present invention, each of the J-shaped arms has a guide portion extending obliquely from the bent portion toward the annular base substantially to the straight portion of the other J-shaped arm to guide the second object wire into between the bent portions.

Also, according to the present invention, the annular base has a substantial shape of C shape whose open end is extended by the straight portion of each J-shaped arm.

Also, according to the present invention, the annular base has a substantial shape of O whose intersecting end is extended by the straight portion of each J-shaped arm.

BRIEF DESCRIPTION OF THE DRAWINGS

These objects and other objects, features, aspects and advantages of the present invention will become more apparent from the following detailed description of the present invention when taken in conjunction with the accompanying drawings, in which.

DETAILED DESCRIPTION OF THE PREFERRED EMBODIMENTS

Figure 1:
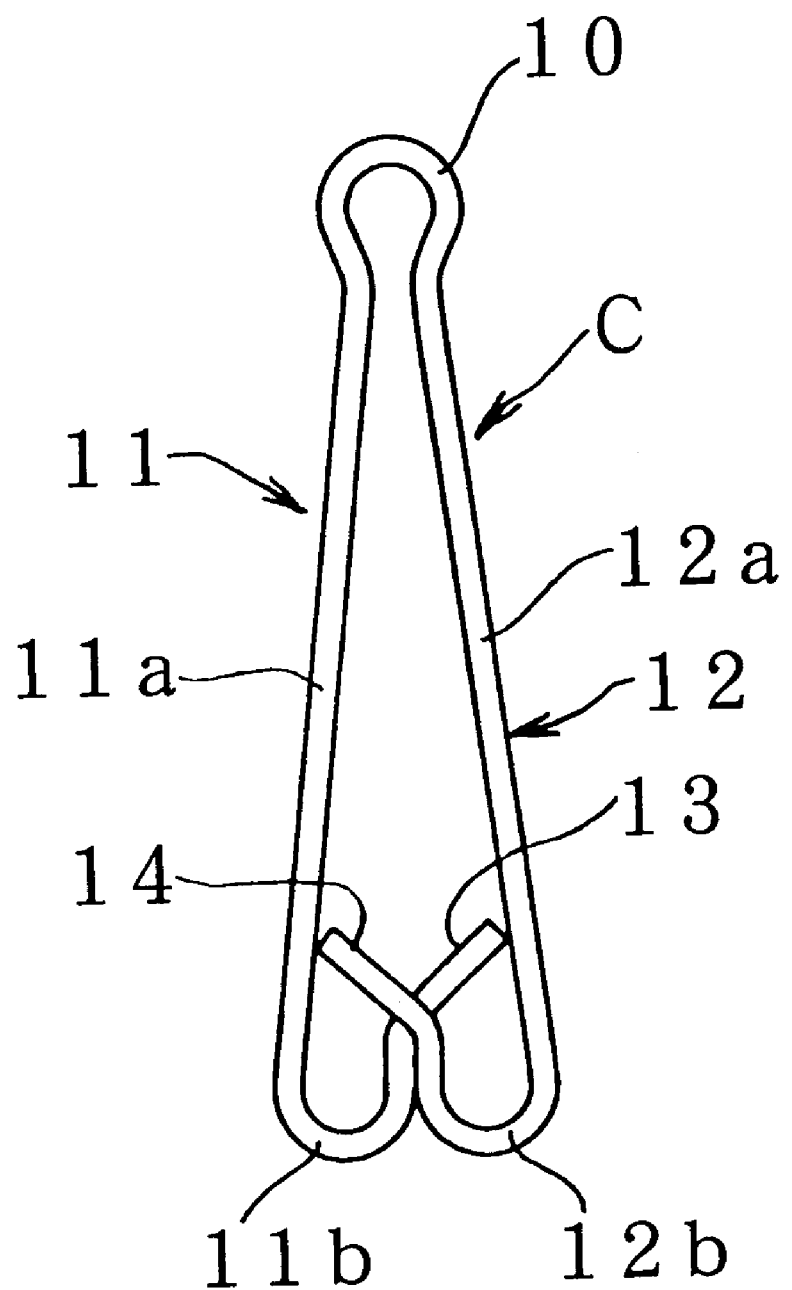
FIG. 1 is a front view of a first embodiment of the clip according to the present invention.
Figure 2:
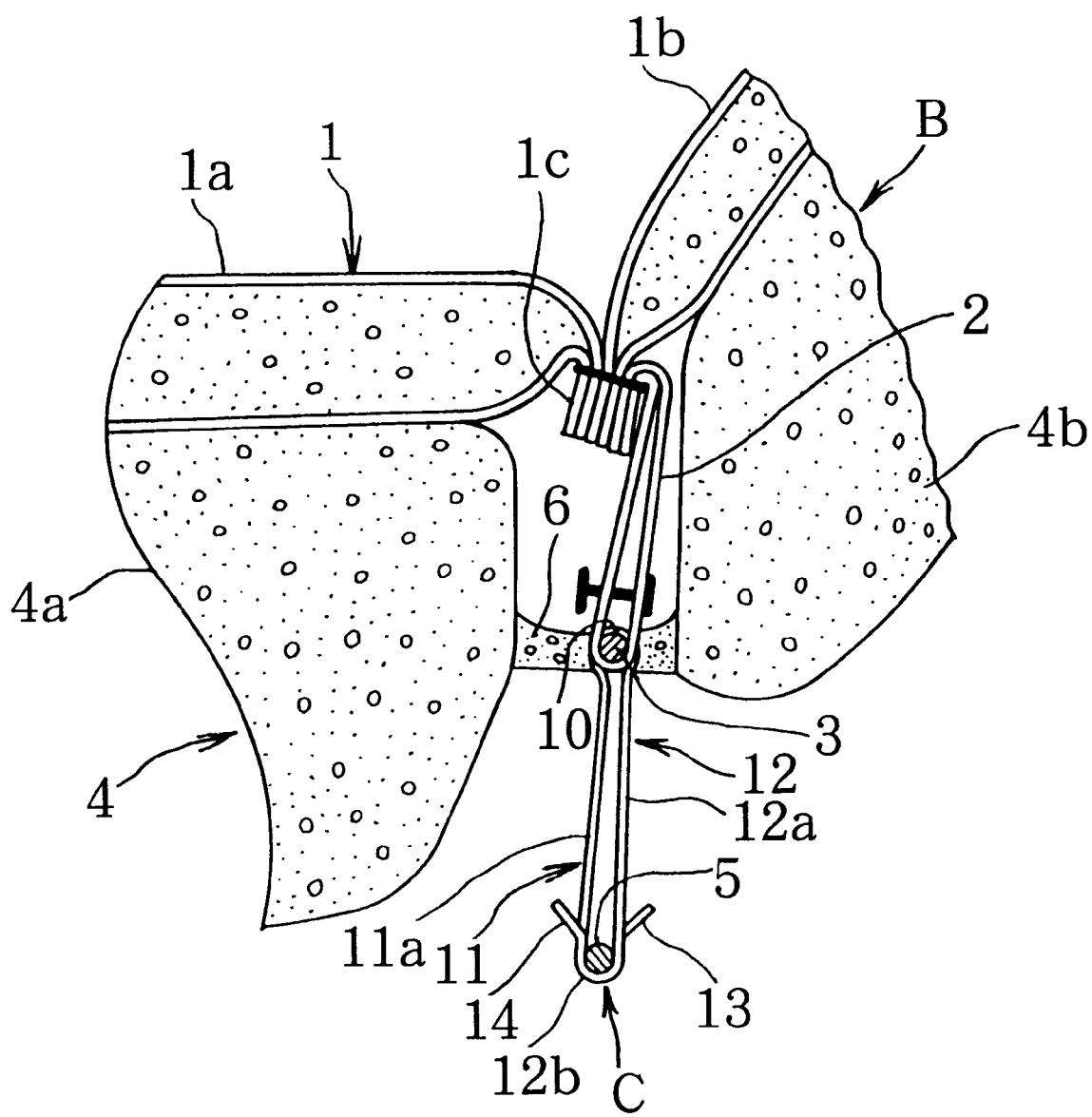
FIG. 2 is a fragmentary sectional view of a seat back of an automotive seat in which the clip in FIG. 1 is used to tension a covering of the seat back.

The present invention will be described herebelow concerning two preferred embodiments of the clip, a first embodiment shown in FIG. 1 and a second embodiment shown in FIG. 10. Through Figures, the clip is generally indicated with a reference C or C'. The embodiments of the clip are formed by curving and bending a highly resilient metal wire. The clip of the present invention used to tension a covering of a seat back of an automotive seat will be illustrated and described by way of example. In FIG. 2, the seat back is generally indicated with a reference B. FIG. 2 shows a seat covering 1 including a central portion covering member 1a and a side portion covering member 1b, sewn to each other at the ends 1c thereof.

The seat to which the present invention is applied has a suspension bag 2 sewn to the ends 1c of the seat covering 1. The suspension bag 2 is partially cut as indicated with a reference 2a at the folded end thereof at predetermined intervals along the length. A trimming wire 3 is introduced through the suspension bag 2 and exposed at each of the cuts 2a in the suspension bag 2. The trimming wire 3 will be also referred to as a first object wire herein. The seat also has a spring 5 such as zigzag spring. In the seat, the spring 5 supports a back pad 4 from behind. The spring 5 is also referred to as a second object wire.

The clip C (C') is hooked on the trimming wire 3 exposed in each cut 2a of the suspension bag 2 and placed in a space 6 defined between a central portion 4a of and side portion 4b of the back pad 4. Further the clip C (C') is hooked on the spring 5 such as a zigzag spring which supports the back pad 4 from behind. Thus the seat covering 1 is tensioned by the clip C (C') bridging the trimming wire 3 and spring 5.

The clip C according to the first embodiment of the present invention comprises annular base 10 having a substantially C shape, and a pair of J-shaped arms 11 and 12. The J-shaped arm 11 comprises a straight portion 11a extending from an open end of the C-shaped base 10, an inwardly bent portion 11b and a guide portion 13 extending obliquely toward the annular base 10 substantially to a straight portion 12a of the other J-shaped arm 12. Similarly the other J-shaped arm 12 comprises similar bent portion 12b and guide portion 14 to those of the J-shaped arm 11. The guide portions 13 and 14 extend obliquely toward the annular base 10 to intersect each other.

Figure 3:
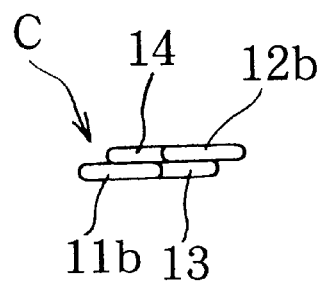
FIG. 3 is a bottom view of the clip in FIG. 1.

The annular base 10 has a somewhat larger diameter than the trimming wire 3. The space between the open ends of the substantially C shape is smaller than the diameter of the trimming wire 3. The straight portions 11a and 12a of the J-shaped arms 11 and 12, respectively, extend obliquely away from each other from the open ends of the annular base 10. The bent portions 11b and 12b are formed in contact with or closely to each other for no gap to exist between them as shown in FIG. 3.

Figure 4:
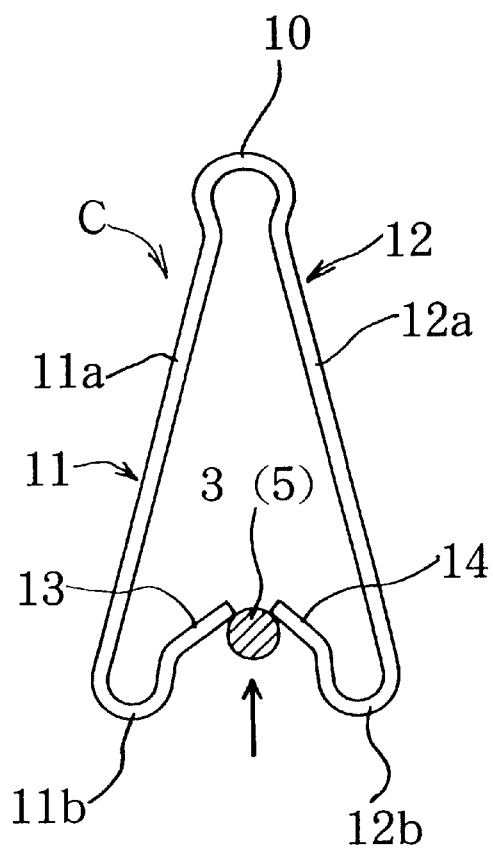
FIG. 4 is an explanatory drawing of the clip in FIG. 1, showing the change in shape of the clip being hooked on a object wire.

To tension the seat covering 1 by securing the end 1c thereof with the clip C, first the clip C is hooked onto the trimming wire 3 exposed in the cut 2a in the suspension bag 2. To this end, the J-shaped arms 11 and 12 are opened away from each other until the guide portions 11b and 12b are apart from each other as shown in FIG. 4, and moved for the clip C to receive the trimming wire 3 through the guide portions 13 and 14. The trimming wire 3 can thus be easily received inside the J-shaped arms 11 and 12 of the clip C.

After the trimming wire 3 is thus received inside the clip C, the J-shaped arms 11 and 12 resiliently opened are released. The J-shaped arms 11 and 12 will restore their respective initial positions. By holding the bent portions 11b and 12b and pulling the clip C, the trimming wire 3 can be received into the annular base 10 through the opening of the latter.

Figure 5:
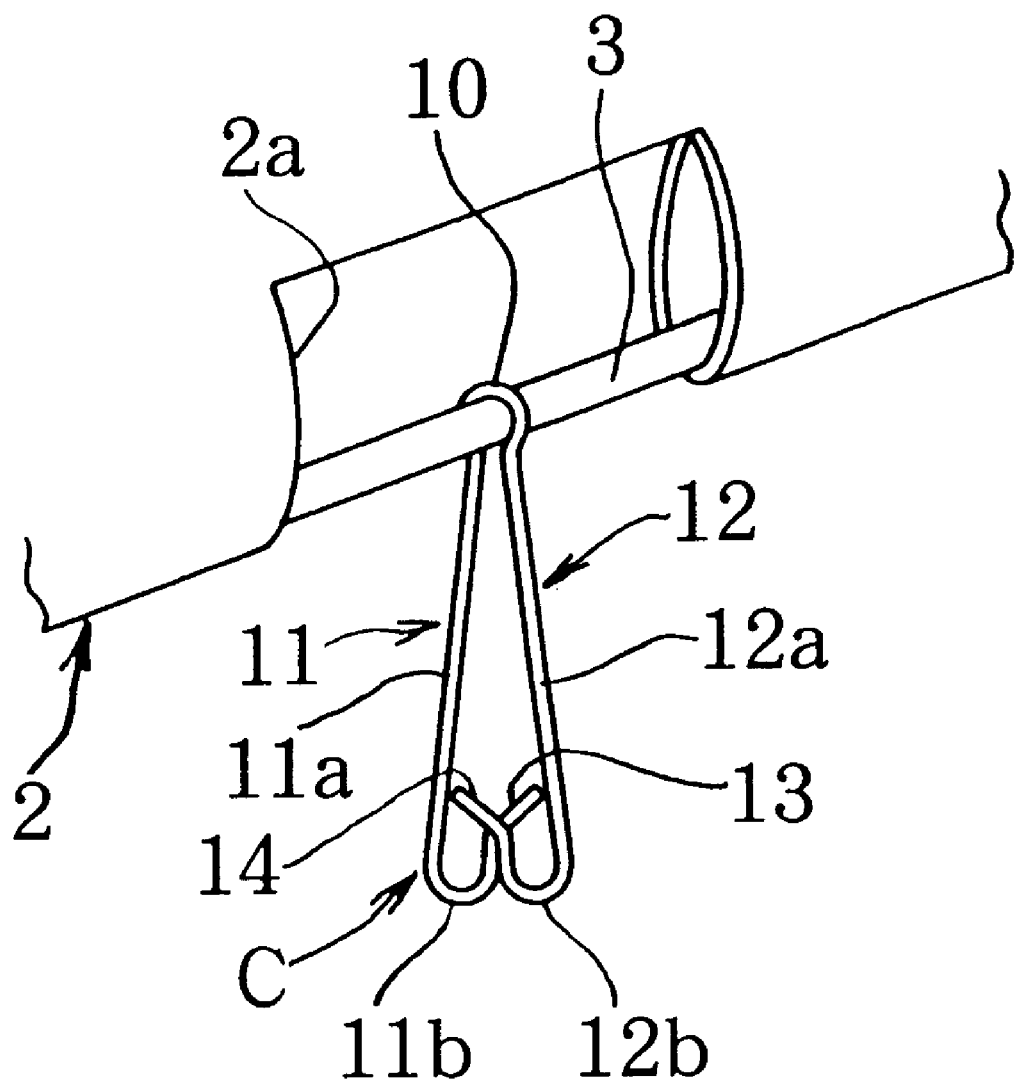
FIG. 5 is a perspective view of a suspension bag in which the clip in FIG. 1 is hooked on a first object wire.

When the J-shaped arms 11 and 12 resiliently opened are released, the guide portions 13 and 14 have their free ends resiliently returned substantially to the straight portions 11a and 12a, respectively, of the J-shaped arms 11 and 12 and thus the guide portions 13 and 14, straight portions 11b and 12b and annular base 10 form together the initial closed loop again. Therefore, the trimming wire 3 can be confined in the closed loop and retained inside the annular base 10. As shown in FIG. 5, the clip C is thus hooked on the trimming wire 3 and exposed in the cut 2a of the suspension bag 2.

Figure 6:
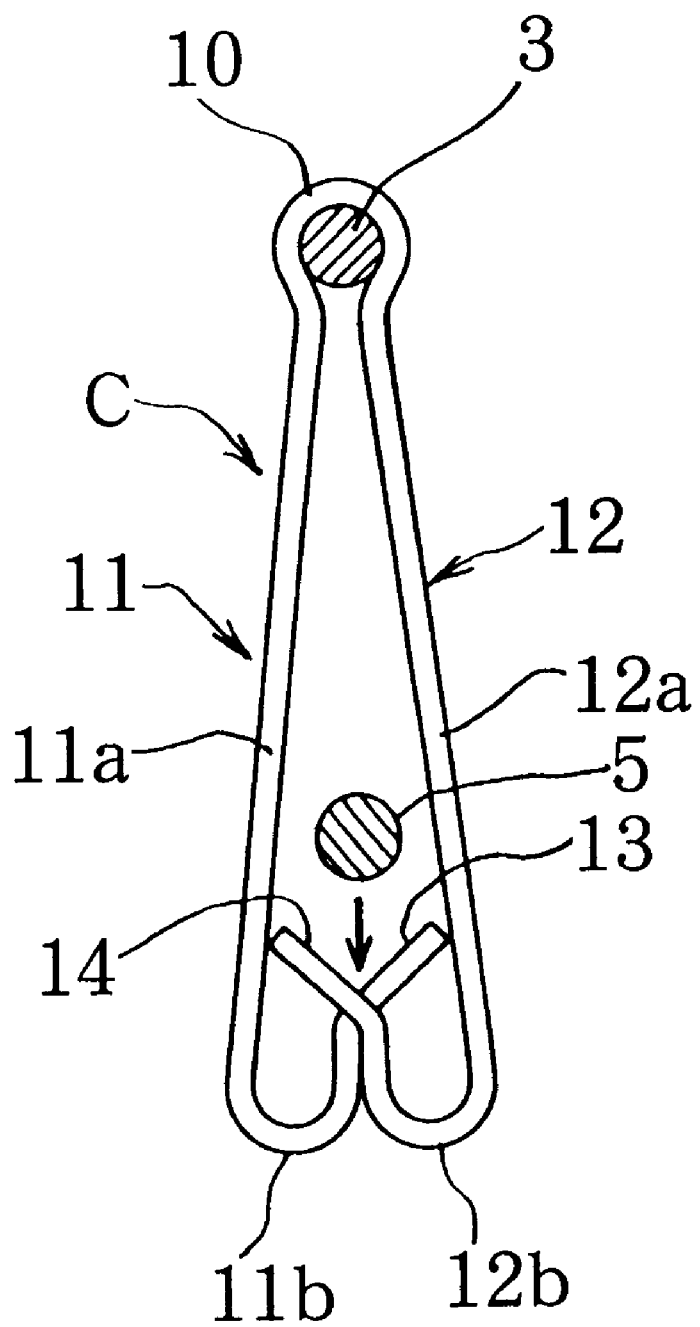
FIG. 6 is an explanatory drawing of the clip in FIG. 1, which is being hooked on a second object wire.

Next, to hook the clip C on the spring 5, the clip C hooked on the trimming wire 3 is placed in the space 6 in the back pad 4 and pulled to behind the back pad 4. Then the J-shaped arms 11 and 12 are resiliently opened away from each other as in the hooking of the clip C onto the trimming wire 3. In this condition, the clip C is further moved to receive the spring 5 therein through the guide portions 13 and 14 thus opened away from each other, as shown in FIG. 6.

After the spring 5 is thus received inside the clip C, the J-shaped arms 11 and 12, and the clip C itself, are released. The J-shaped arms 11 and 12 will restore their respective initial positions under the resilience of them. In this case, the clip C will be pulled by the trimming wire 3 while being retained by the spring 5. The spring 5 will thus force the guide portions 13 and 14 at the intersection thereof and be received between the bent portions 11b and 12b. Here the bent portions 11b and 12b are superposed on each other. Since each guide portion 13 or 14 is extended obliquely toward the annular base 10 substantially to the straight portion of the other J-shaped arm 11 or 12 as previously described, the guide portions 13 and 14, straight portions 11a and 12a and annular base 10 form together the closed loop. Therefore, the spring 5 can be securely received in between the superposing bent portions 11b and 12b from the intersection of the guide portions 13 and 14.

Figure 7:
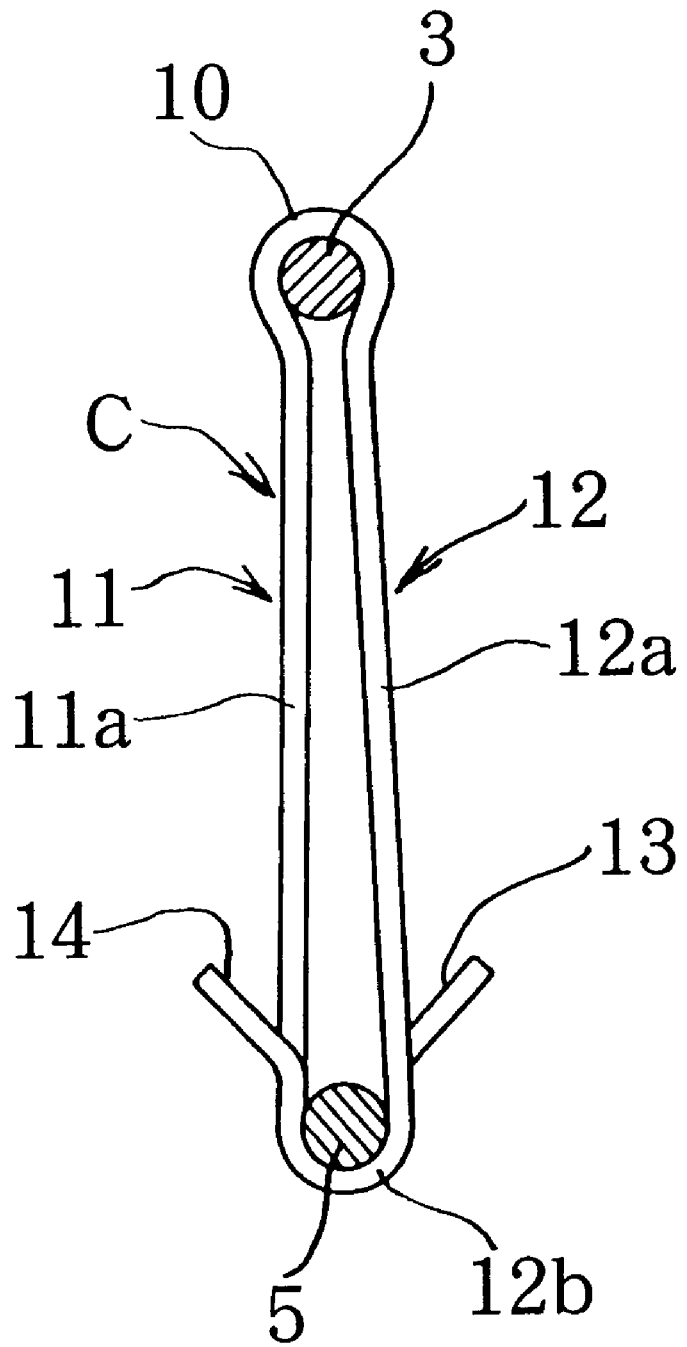
FIG. 7 is an explanatory drawing of the clip in FIG. 1, which is hooked at the bent portions thereof on the second object wire.

More particularly, as the spring 5 is thus received in between the bent portions 13 and 14 from the intersection of the guide portions 11b and 12b it forces the bent portions 11b and 12b to resiliently displace for precise superposition onto each other. Thus, the clip C will securely retain the spring 5 between the bent portions 11b and 12b as shown in FIG. 7. Since the entire clip C forms the closed loop as mentioned above, the trimming wire 3 and spring 5 thus received in the clip C will not be allowed to come out of the clip C.

Also since the J-shaped arms 11 and 12 are extended from the annular base 10 by the straight portions 11a and 12a divergently, namely, in directions away from each other, the bent portions 11b and 12b will resiliently force the spring 5 caught between them in opposite directions so that the spring 5 will be securely caught between them.

Therefore, both the trimming wire 3 and spring 5 can be retained by the clip C not to come out of the clip C itself, and furthermore since the spring 5 is securely caught by the bent portions 11b and 12b which tend to resiliently return in opposite directions, the bent portions 11b and 12b will not possibly be elongated even when the clip C is heavily tensioned. Thus the seat covering 1 can be positively kept tensioned by securing its end 1c with the clip C.

Figure 8:
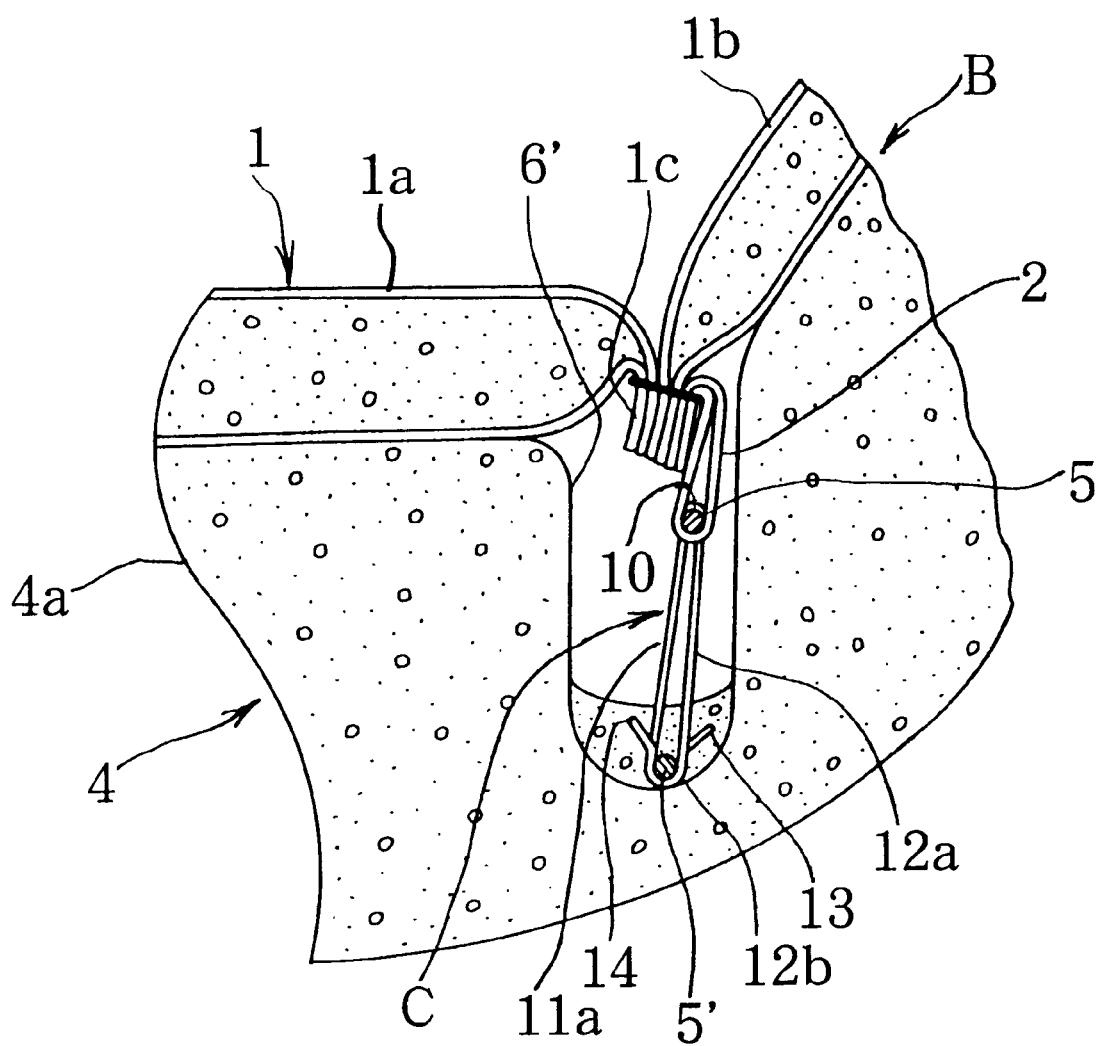
FIG. 8 is a fragmentary sectional view of another type of seat back in which the clip in FIG. 1 is used to tension a covering of the seat back.

The first embodiment of the present invention has been described concerning the clip C used in a seat having provided therein the spring 5 such as a zigzag spring as the second object wire. It should be noted, however, that the second object wire may be an insert wire 5' embedded in the back pad 4 as shown in FIG. 8.

The insert wire 5' may be embedded in the back pad 4 so that it is partially exposed in a space 6'. In this case, the clip C is used to bridge the trimming wire 3 exposed in the cuts 2a in the suspensions bag 2 and the insert wire 5' exposed inside the space 6'.

Figure 9:
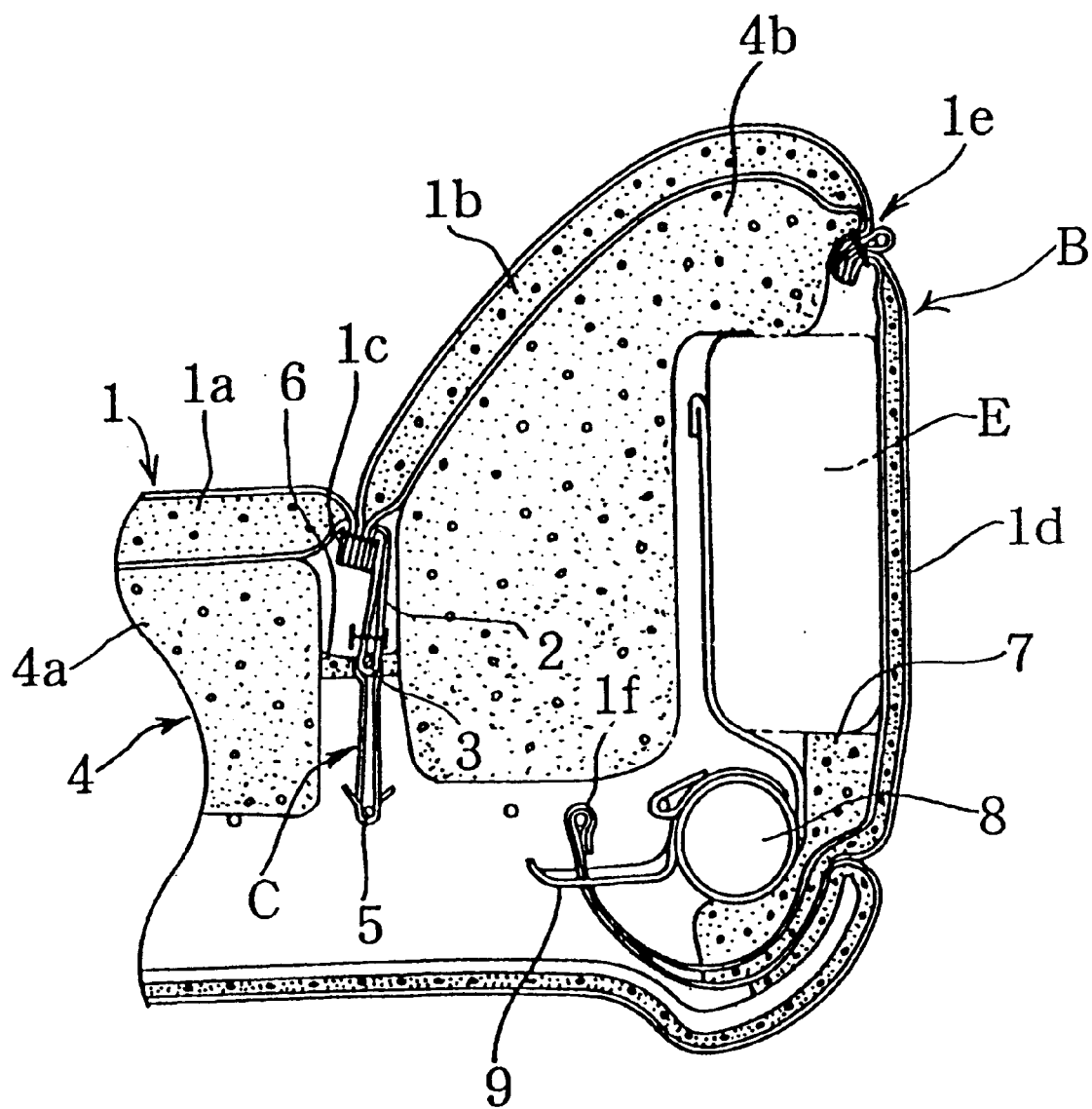
FIG. 9 is a fragmentary sectional view of a seat back having an air bag module incorporated in the right side portion thereof, in which the clip in FIG. 1 is used to tension the seat covering.

The clip C having been described in the foregoing may be used in a seat back incorporating an air bag module E in an opening 7 of a side portion 4b of a back pad 4 and having a covering member 1b for the side portion 4b and a lateral covering member 1d, the adjoining ends of the covering member 1b and lateral covering member 1d being sewn on each other to provide a fission line 1e, as shown in FIG. 9. The adjoining ends of the covering members 1b and 1d are fissured along the fission line 1e when the air bag is inflated.

As shown in FIG. 9, the seat back is provided therein with a frame 8 having a bracket plate 9. The lateral covering member 1d covering the lateral side of the seat back B can be tensioned with the other end 1f thereof fixed securely in place with the bracket plate 9. In addition, the seat back B has a covering member 1a for the central portion of the back pad 4. The central-portion covering member 1a and side-portion covering member 1b are sewn on each other at the ends 1c thereof. The ends 1c of the covering members 1a and 1b are retained with the clip C as mentioned above.

Since both the ends 1c and end 1f can be securely retained against the expansion pressure of the inflated air bag, when the air bag is inflated, the expansion pressure of the inflated air bag can be concentrated to the fission line or sewn ends 1e which will thus be quickly fissured.

Figure 10:
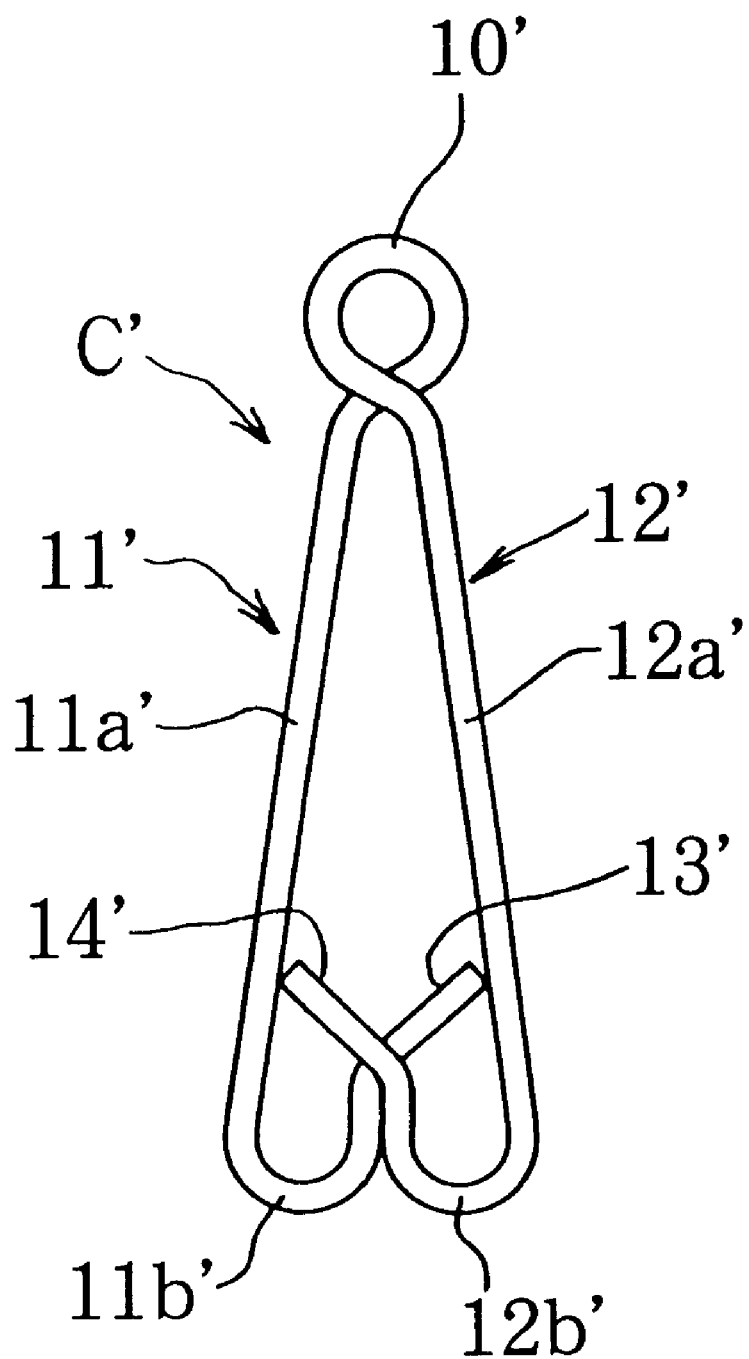
FIG. 10 is a front view of a second embodiment of the clip according to the present invention.

The clip C' according to the second embodiment of the present invention is shown in FIG. 10. As seen, it includes an annular base 10' having a substantially O shape, and a pair of J-shaped arms 11' and 12' having straight portions 11a' and 12a' extending in a same direction from the intersection of the annular base 10' or the J-shaped arms 11' and 12'.

In other respects, the clip C' has a similar construction to the aforementioned clip C since the J-shaped arm 11' further comprises an inwardly bent portion 11b' and a guide portion 13' extending obliquely toward the annular base 10' substatntially to the straight poriton 12a' of the other J-shaped arm 12' while the other J-shaped arm 12' further comprises similar bent protion 12b' and guide portion 14' to those of the J-shped arm 11'. As in the clip C, the guide protions 13' and 14' extend obliquily toward the annular base 10' to intersect each other.

Also in this clip C', the J-shaped arms 11' and 12' have the straight portions 11a' and 12a' extending divergently or in directions away form each other. The bent portions 11b' and 12b' are formed in contact with or closely to each other for no gap to exist between them. Note that in the clip C', the intersection of the annular base 10' lies in a place where the intersection of the bent portions 11b' and 12b' also lies.

Figure 11:
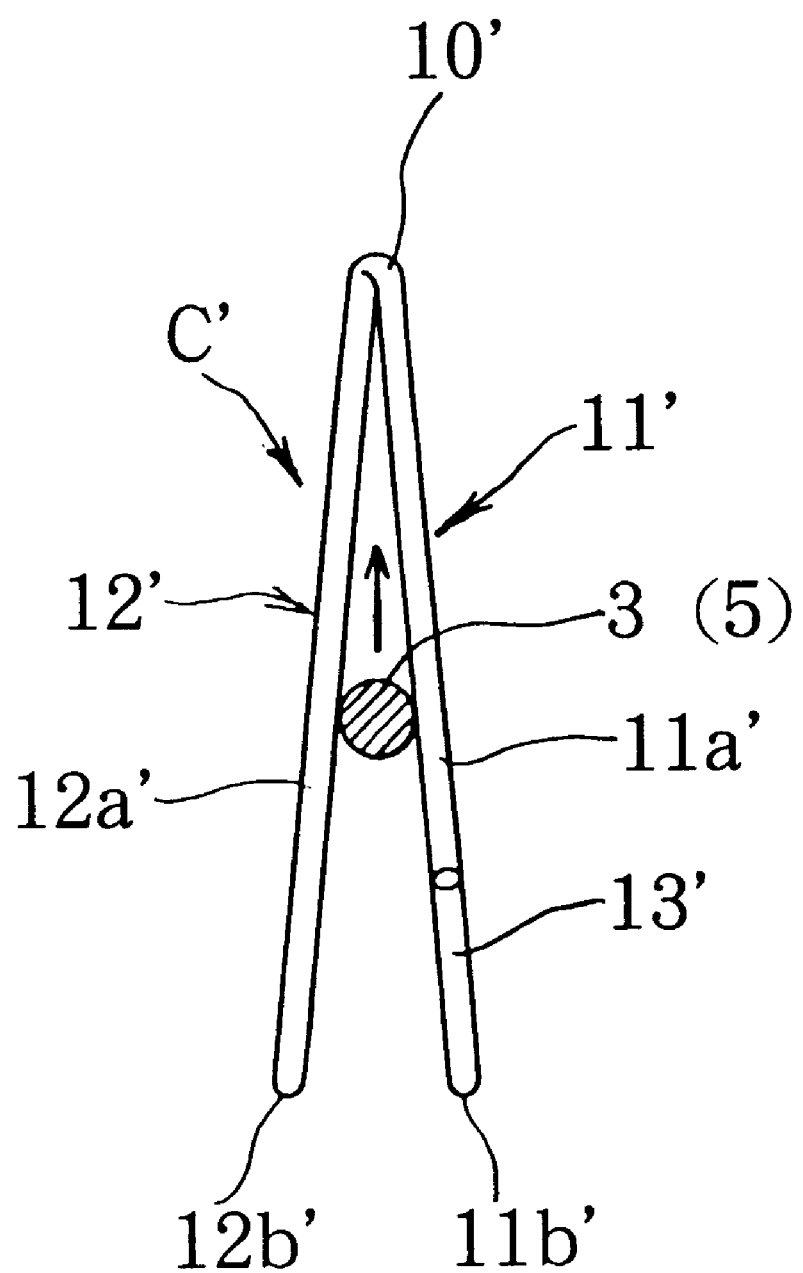
FIG. 11 is an explanatory drawing of the clip in FIG. 10, showing the change in shape of the clip being hooked on a object wire.
Figure 12:
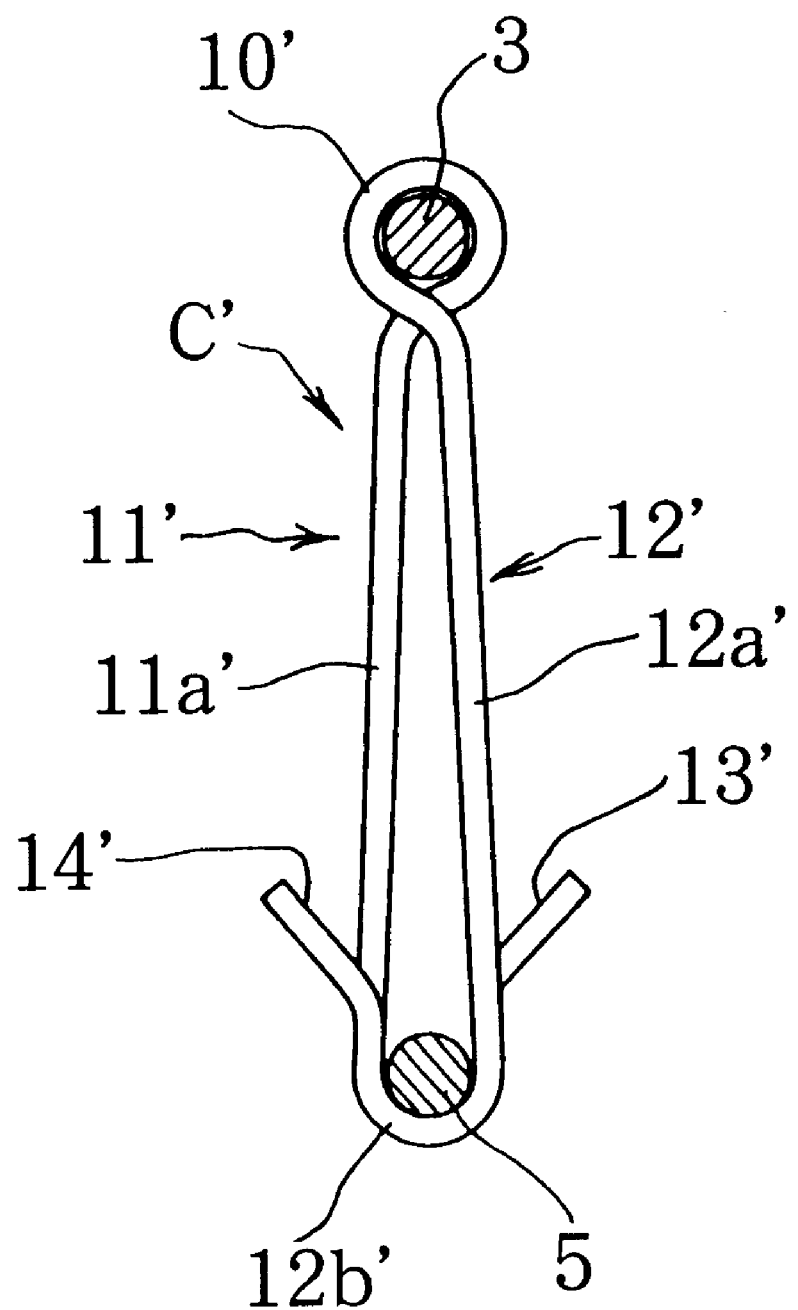
FIG. 12 is a front view of the clip in FIG. 10, which is hooked on both first and second object wires.

To receive the trimming wire 3 into the clip C', the J-shaped arms 11' and 12' are resiliently deflected toward each other until the annular base 10' is opened at the intersection of the J-shaped arms 11' and 12' to such an extent that the trimming wire 3 is allowed to enter into the annular base 10'. Alternatively, the J-shaped arms 11' and 12' may be resiliently deflected from each other in the back-and-forth direction to separate the bent portions 11b' and 12b' from each other as shown in FIG. 11. Thus the trimming wire 3 can be moved into the annular base 10' through between the J-shaped arms 11' and 12' thus separated from each other.

Similarly to the clip C according to the first embodiment, the spring 5 can be received into between the J-shaped arms 11' and 12' and then moved along the guide portions 13' and 14' to between the bent portions 11b' and 12b' which will then be superposed on each other.

Also the annular base 10' having a substantial O shape and J-shaped arms 11' and 12' of the clip C' form together a closed loop from which the trimming wire 3 and spring 5 cannot come out unless the clip C' is operated to remove them from inside it. Further, the spring 5 is securely caught between the bent portions 11b' and 12b' which tend to restore their initial positions. Therefore, the bent portions 11b' and 12b' will not possibly be elongated even when the clip C' is heavily tensioned. Thus the seat covering 1 can be positively kept tensioned by securing its end 1c with the clip C'.

Figure 13:
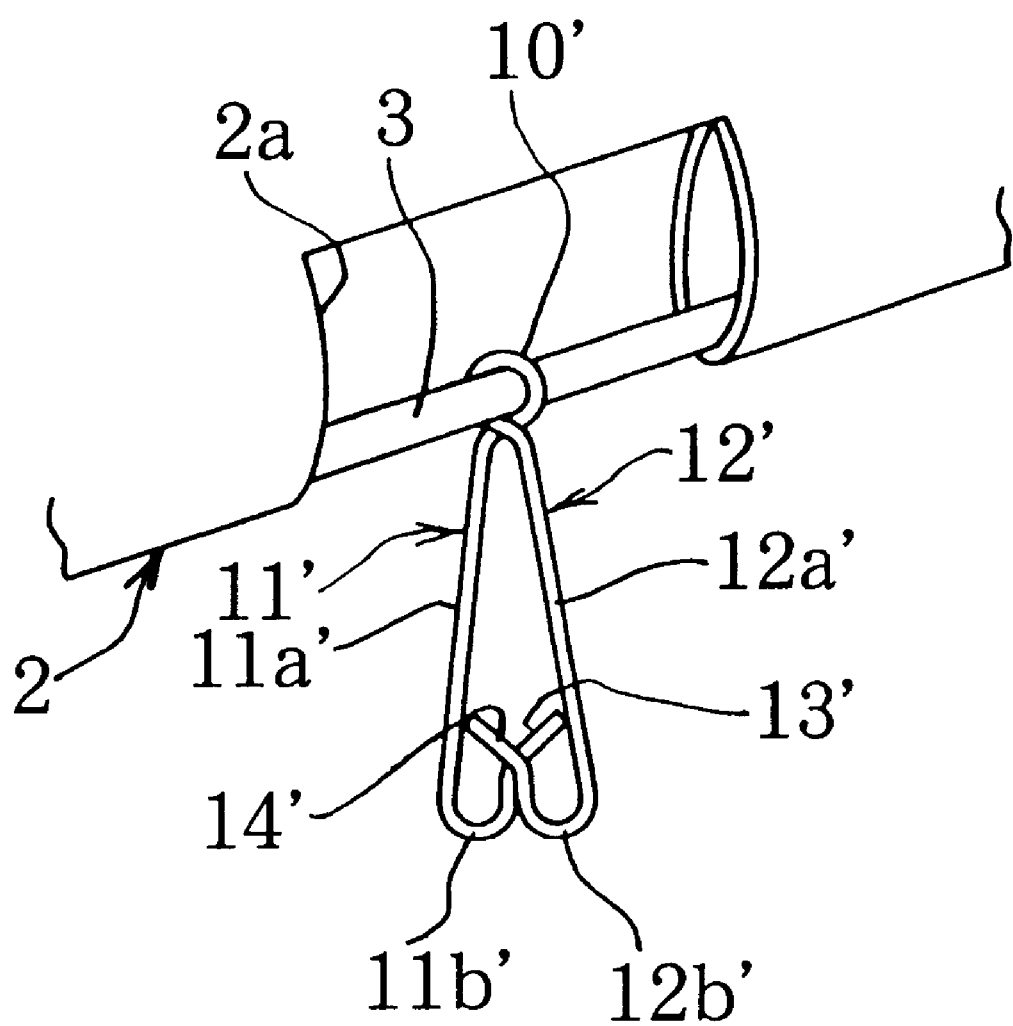
FIG. 13 is a perspective view of a suspension bag in which the clip in FIG. 10 is hooked on the first object wire.

In addition, since the clip C' of the second embodiment is hooked on the trimming wire 3 so that the latter is received in the annular base 10' closed with the intersection as shown in FIG. 13, it will not possibly go into the suspension bag 2 from the cut 2a or the trimming wire 3 will not possibly come out of the annular base 10' so that the clip C' will not hang at the opposite end thereof on the trimming wire 3.

Therefore, the clip C' according to the second embodiment is advantageous in that once it is hooked on the trimming wire 3 in a seat covering manufacturing post, it may be installed to the back pad 4 without the necessity of correcting its position in a downstream post where the seat covering is to be tensioned. The clip C' can thus be used very easily.

In the foregoing, the present invention has been described concerning the clips C and C' as the first and second embodiments of the present invention, by way of example. The clips are made by bending a metal wire. However, the clip may be formed by bending a metal plate spring or molding a resin. The foregoing description of the present invention refers to the use of the clip C or C', by way of example, to pull the sewn ends 1c of the covering member 1a for the central portion and the covering member 1b for the side portion of the seat back B in order to tension the seat covering 1 including the covering members 1a and 1b. The clip according to the present invention may also be used to similarly tension the sewn ends of covering members for upper and lower central portions of the seat back B along the width of the central portions.

As having been described in the foregoing, the seat covering tensioning clip according to the present invention comprises the annular base, and the pair of J-shaped arms extending from the annular base in a nearly same direction, each having a straight portion and an inwardly bent portion. The bent portions face each other. The clip receives each of the first and second object wires from between the bent portions thereof. Thereafter the first object wire is securely retained in the annular base while the second object wire is securely caught between the bent portions superposed on each other. Owing to this configuration of the clip, the first and second object wires cannot come out of the clip. The second object wire is securely caught between the bent portions. Therefore, the bent portions will not possibly be elongated even when they are heavily tensioned. The seat covering can thus be tensioned with the sewn ends of the covering members positively retained with the clip.

In particular, the clip can be used in a seat incorporating an air bag module in the back pad and of which the covering member for the side portion, and the covering for the lateral side, of the seat back are sewn at the ends thereof to form a fission line which will be fissured when the air bag is inflated. Since both the ends of the central- and side-portion covering members and those of the side-portion and lateral covering members can be securely retained against the expansion pressure of the inflated air bag, when the air bag is inflated, the expansion pressure of the inflated air bag can be concentrated to the fission line or sewn ends which will thus be quickly fissured.

Also, the pair of J-shaped arms has the straight portions thereof extended from the annular base obliquely away from each other, and the second object wire put inside the clip is securely caught between the bent portions which are superposed on each other. Since the bent portions tend to resiliently return in opposite directions to press the second object wire in opposite directions, the second object wire can be very securely caught between the bent portions.

Also, each of the J-shaped arms has a guide portion extending obliquely from the bent portion toward the annular base substantially to the straight portion of the other J-shaped arm to guide the second object wire into between the bent portions. Therefore, the second object wire can be positively guided from the intersection of the bent portions into between the bent portions without the second object wire entering into any of the bent portions.

Also, the annular base has a substantially C shape whose open end is extended by the straight portion of each J-shaped arm. The first object wire can be received into the annular base from the opening of the latter, and once set in the annular base, it will not easily come out of the annular base.

Also, the annular base has a substantially C shape whose intersecting end is extended by the straight portion of each of the J-shaped arms. Therefore, since the clip is hooked on the first object wire so that the latter is received in the annular base closed with the intersection, it will not possibly go into the suspension bag from the cut of the first trimming wire will not possibly come out of the annular base so that the clip will not hang at the opposite end thereof on the first object wire.

It should be noted that the terms and expressions having been employed herein are used as terms of description, not of limitation. In the use of such terms and expressions, there is no intention of excluding any equivalents of the features illustrated and described or portions thereof. However, it is recognized that various modifications are possible within the scope of the invention claimed.

What is claimed is:

1. A tensioning clip for use in a seat having a seat pad, a seat covering, a first object wire provided on said seat covering, and a second object wire supporting said seat pad or embedded in said seat pad, said tensioning clip being incorporated into said seat for bridging said first object wire and said second object wire;

said tensioning clip comprising:
        an annular base; and
        a pair of J-shaped arms extending from the annular base in a nearly same direction, and each having a straight portion, an inwardly bent portion, and a guide portion, the bent portions facing each other and the guide portion extending obliquely from the bent portion toward the annular base of one of the J-shaped arms substantially to the straight portion of the other J-shaped arm to guide the second object wire between the bent portions;
        the tensioning clip being adapted to receive each of the first and second object wires from between the bent portions thereof, whereby the first object wire is securely retained in the annular base while the second object wire is securely caught between the bent portions superposed on each other.

2. A tensioning clip for use in a seat having a seat pad, a seat covering, a first object wire provided on said seat covering, and a second object wire supporting said seat pad or embedded in said seat pad, said tensioning clip incorporated into said seat for bridging said first object wire and said second object wire;

said tensioning clip comprising:
        an annular base; and
        a pair of J-shaped arms extending from the annular base in a nearly same direction, and each having a straight portion, and an inwardly bent portion, and a guide portion, the straight portions extending from the annular base obliquely away from each other, the bent portions facing each other, and the guide portion extending obliquely from the bent portion toward the annular base of one of the J-shaped arms substantially to the straight portion of the other J-shaped arm to guide the second object wire between the bent portions;
        the tensioning clip being adapted to receive each of the first and second object wires from between the bent portions thereof, whereby the first object wire is securely retained in the annular base while the second object wire is securely caught between the bent portions superposed on each other.

3. The tensioning clip as set forth in claim 1 or 2 wherein said annular base has a substantially C shape whose open end is extended by said straight portions of said J-shaped arms.

4. The tensioning clip as set forth in claim 1 or 2 wherein said annular base has a substantially O shape whose intersecting end is extended by said straight portions of said J-shaped arms.

5. The tensioning clip as set forth in claim 1 or 2 wherein said first object wire comprises a trimming wire and said second object wire comprises a spring.

* * * * *